No. 765,664. PATENTED JULY 26, 1904.
J. T. FULLER.
COTTON PRESS.
APPLICATION FILED DEC. 13, 1899.
NO MODEL. 3 SHEETS—SHEET 1.
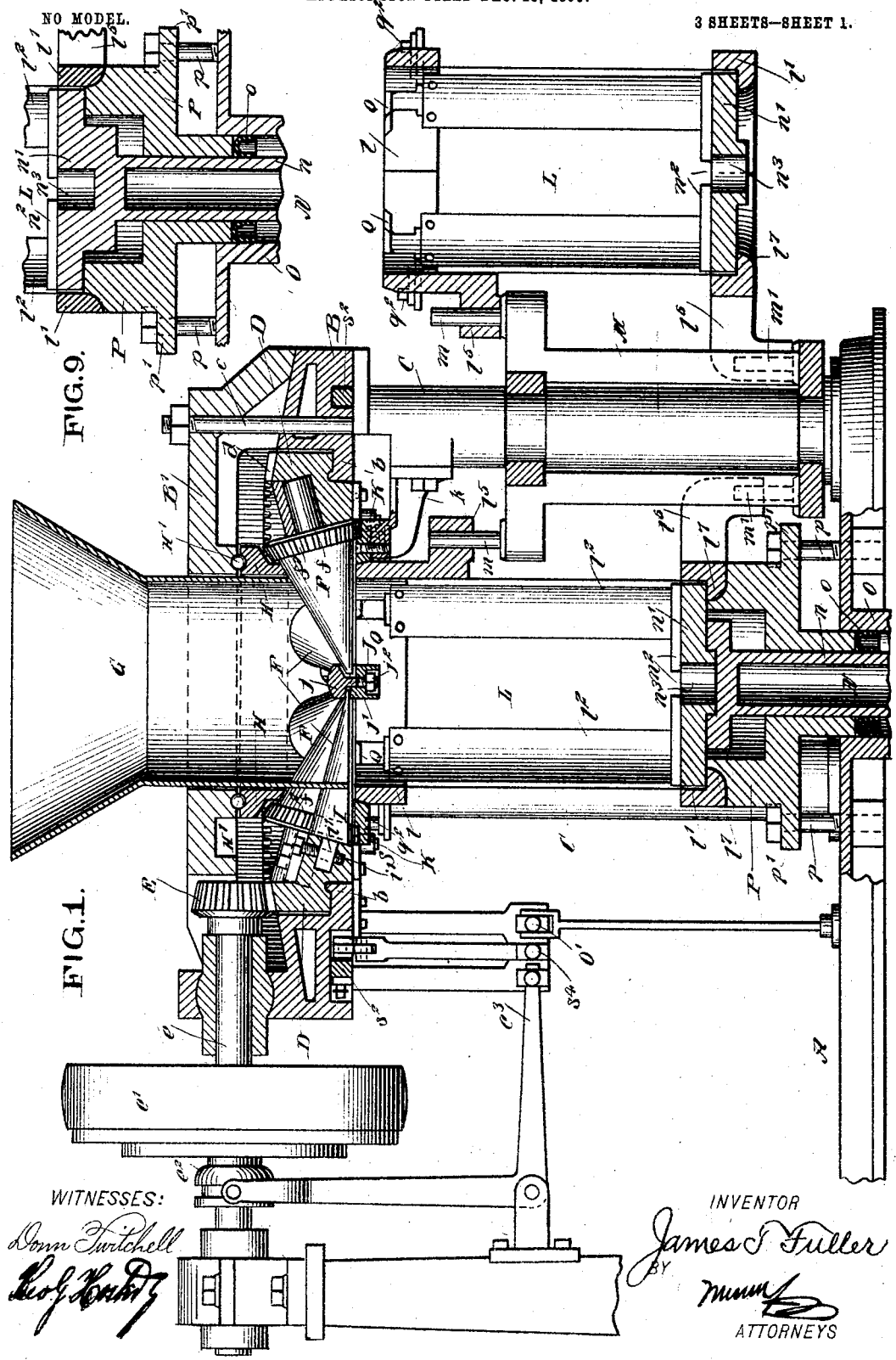

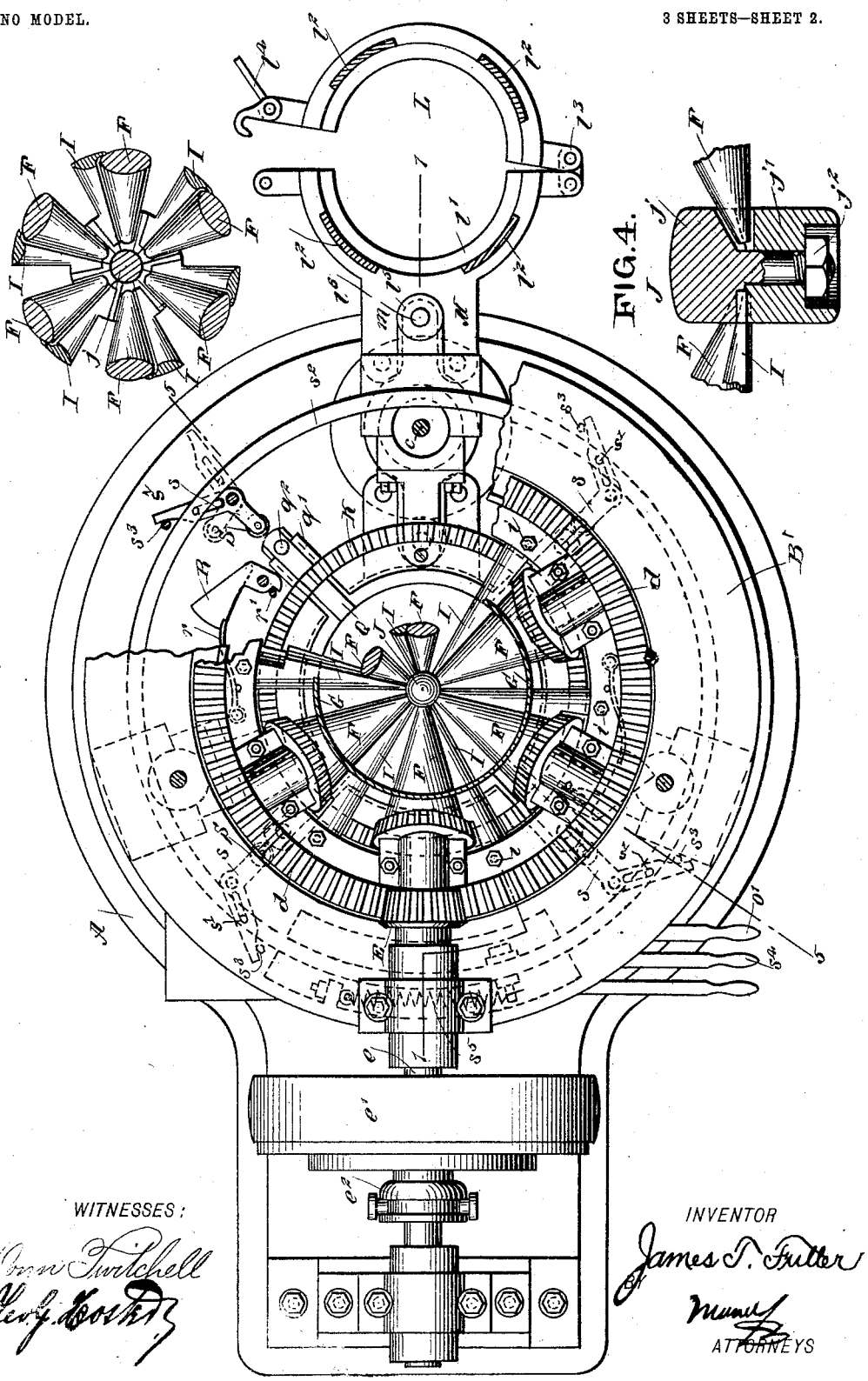

No. 765,664. PATENTED JULY 26, 1904.
J. T. FULLER.
COTTON PRESS.
APPLICATION FILED DEC. 13, 1899.
NO MODEL. 3 SHEETS—SHEET 3.

WITNESSES
Donn Twitchell
Geo. J. Hosted

INVENTOR
James T. Fuller
BY
ATTORNEYS

No. 765,664. Patented July 26, 1904.

UNITED STATES PATENT OFFICE.

JAMES T. FULLER, OF CALVERT, TEXAS, ASSIGNOR TO JULIUS F. WORKUM, OF ENGLEWOOD, NEW JERSEY.

COTTON-PRESS.

SPECIFICATION forming part of Letters Patent No. 765,664, dated July 26, 1904.

Application filed December 13, 1899. Serial No. 740,187. (No model.)

*To all whom it may concern:*

Be it known that I, JAMES T. FULLER, a citizen of the United States, and a resident of Calvert, in the county of Robertson and State of Texas, have invented a new and Improved Baling-Press, of which the following is a full, clear, and exact description, reference being had to the accompanying drawings, forming part of this specification.

The object of my invention is the production of a press adapted for baling cotton and other materials in cylindrical bales in which the material forming the bales is compactly arranged under heavy pressure in superimposed spiral layers or laps; and the invention consists of parts hereinafter described, and specifically pointed out in the claims.

Figure 5:
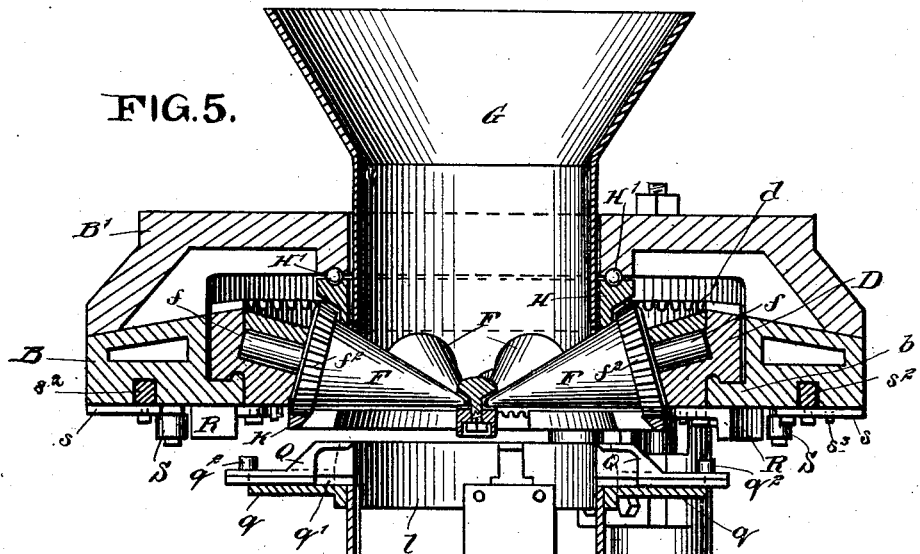
Figure 6:
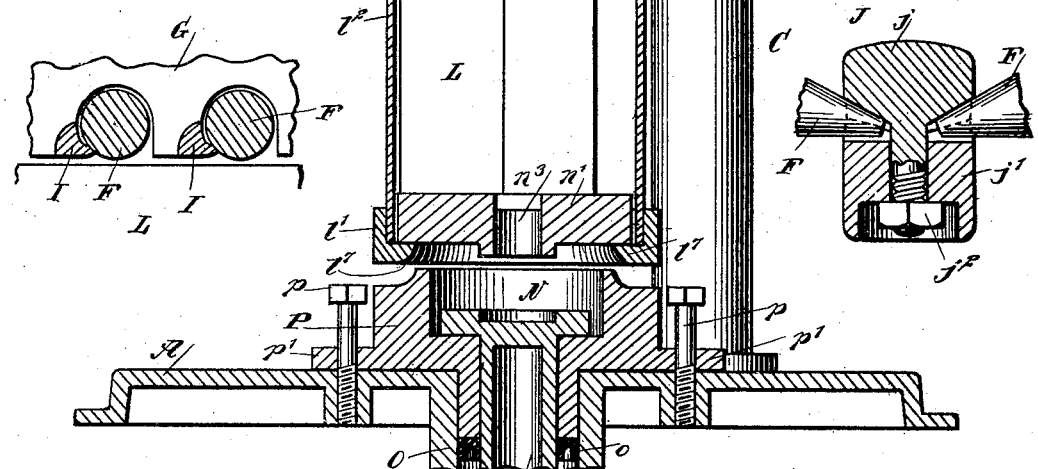
Figure 7:
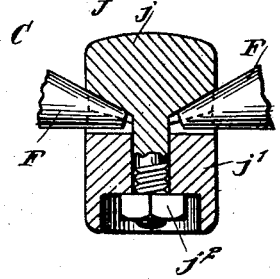
Figure 8:
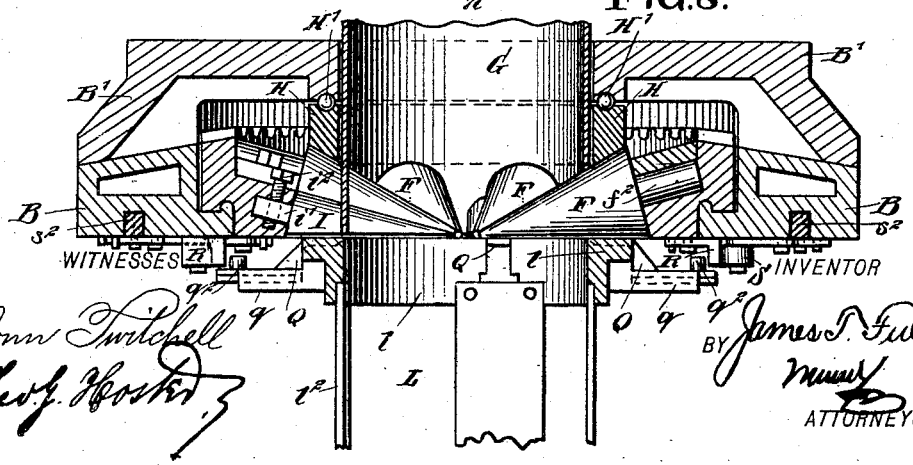

In the drawings, Figure 1 is a sectional elevation on the line 1 1, Fig. 2. Fig. 2 is a plan view, partly in section. Fig. 3 is a detail plan view showing the arrangement of the feed-rollers, stripping-fingers, and core-button. Fig. 4 is a detail view showing the same in sectional elevation. Fig. 5 is a sectional elevation on the line 5 5, Fig. 2. Fig. 6 is an enlarged transverse section of adjacent feed-rollers and stripping-fingers about midway between their inner and outer ends. Fig. 7 is a sectional elevation, on an enlarged scale, showing a modification in which the core-button rests on the inner ends of the feed-rollers. Fig. 8 is a sectional elevation showing a modified arrangement of mechanism for driving the rollers, and Fig. 9 is a sectional side elevation of a modified form of follower.

Similar reference characters are employed to designate corresponding parts in all the views.

The press is mounted on a base A. The annular ring B and head B' are supported above the base by the standards C and are held in place by bolts $c$, which extend to the base A through the standards C. The ring B is formed with the annular bearing or track $b$, upon which is supported the revolving carrier D. The carrier D is provided with a circular rack $d$, which extends entirely around its upper outer edge, and a pinion E, carried by the driving or power shaft $e$ of the press, is arranged to mesh with said rack, so that as the shaft $e$ is revolved the carrier D is also revolved on its annular bearing $b$. A driving-pulley $e'$ is carried by the shaft $e$, and the rotation of the shaft may be controlled by any suitable mechanism, such as the clutch $e^2$ and its operating-lever $e^3$. The rollers F, by which the cotton or other material is fed into the baling-chamber from the feed-hopper G against the pressure means to be hereinafter described, are conical in shape and are arranged radially, preferably equidistant, with their lower or under surfaces in a horizontal plane over the baling-chamber. These feeding-rollers are journaled in a revoluble carrier D, which is provided with bearings for the journals $f$ of the rollers. The rollers F approach closely toward a common center, as clearly shown in all the views except Figs. 6 and 9, and the rollers are unsupported at their inner ends or apices. The absence of a working journal or bearing at the inner ends of the rollers dispenses with the necessity of lubrication at such points and permits a construction which affords a clear and unobstructed feed-space above the rollers.

For the purpose of relieving the pressure on the journals $f$ and their bearings I prefer to provide an overhead thrust-bearing between the journals and the working surfaces of the rollers. As shown, this consists of a ring H, which surrounds the feed-hopper and engages with the surface of the rollers F. The pressure exerted against the ring H is received by the under surface of the head B', and to permit the ring to turn freely and with as little resistance as possible I provide a suitable antifriction device between the ring H and the head B', such as the ball-bearing H'.

A stripping-finger I is provided for each roller F, and the fingers are preferably of such shape and are so arranged and supported as not to project above the plane of the axes of the rollers, thus leaving an unobstructed passage for the material to the rollers. As shown, said fingers are secured in the carrier D by the bolts $i$, which pass through lugs $i'$, entering recesses in the carrier. The fingers I extend along the lower surface of the feed-rollers on the non-feeding side of their axial lines, Fig. 6, and prevent the material from being carried up by the rollers, and each finger is spaced from the next adjacent roller such distance as may be necessary to form a passage or feed-space of the requisite width to form layers or laps of the proper thickness. The outer ends of the fingers I support the feed-hopper G, so that the fingers, feed-rollers, and the hopper all revolve with the carrier.

Particularly where cotton is the material to be operated upon I prefer to form the bale with a central longitudinal opening or bore extending through the bale from end to end to facilitate the operation of tying the bale, and for this purpose I provide a button or guide J, which I term a "core-button," which is carried in the space defined by the approaching ends or apices of the feed-rollers F and extends well below the lower surfaces of the rollers. This core-button is preferably formed in two separable sections, one of which, $j$, lies above the surface of the feed-rollers and is provided with a threaded shank, while the other section, $j'$, lies below the surfaces of the feed-rollers and is countersunk to receive the nut $j^2$, which is screwed upon the shank of the section J' and binds the sections firmly together. The button J is formed with recesses to receive the ends of the feed-rollers and stripping-fingers, and, as shown in Figs. 1, 3, 4, and 5, it is supported on the inner ends of the stripping-fingers I; but where the stripping-fingers are not employed or when for any reason it is desired not to support the button on the stripping-fingers the upper section or portion thereof, as shown in Fig. 7, simply rests upon the ends of the feed-rollers, the recesses for the stripping-fingers in such case being dispensed with.

It is necessary that the feed-rollers F should be revolved on their axes while they are traveling around their common axis, and to accomplish this I have illustrated two preferred forms of driving mechanism. In Figs. 1, 2, and 5 each roller carries at its outer end a pinion $f^2$, which meshes with a fixed circular rack K, carried on brackets $k$, secured to the standards C, so that as the rollers are carried around by the revolving carrier the pinions $f^2$ will engage with the rack and turn the rollers axially. In the modification shown in Fig. 8 the pinions and rack are dispensed with, and the axial rotation of the rollers is produced by frictional contact between the lower surfaces of the rollers as they are carried around and the upper surface of the ring $l$, which surrounds the top of the baling-chamber L.

Below what I have called the "working" surfaces of the feed-rollers (and I employ this term to designate those portions of the rollers by which the feeding and pressing operations are performed) is the baling-chamber L, consisting of the rings $l$ $l'$, connected with each other by the staves $l^2$. The rings $l$ $l'$ are made in sections connected by a hinge $l^3$ and fastening device $l^4$, Fig. 2. The rings $l$ and $l'$ are provided with lugs $l^5$ and $l^6$, apertured to receive the pins $m$ $m'$ on the yoke or crane M, which is rotatably carried by the standard C. As shown, two baling-chambers are supported by the yoke M, either of which may swing into position under the rollers, and the construction illustrated permits either chamber to be raised and lowered on the pins $m$ $m'$ to and from its operative position independently of the yoke and any other chamber.

The particular pressure means which I have illustrated and preferably employ consists of a follower N, actuated by hydraulic pressure, although I do not intend to limit myself to hydraulic mechanism. The follower consists of a plunger $n$, terminating in a plate $n'$, which fits the interior of the baling-chamber. The plunger and plate may be of integral construction, as shown in Fig. 9; but when a plurality of baling-chambers are employed I prefer to construct the plunger $n$ and the plate $n'$ in separable parts, as shown in the other views, and to provide a separate follower-plate for each baling-chamber, forming the lower ring $l'$ of the baling-chamber with an inwardly-extending flange $l^7$, upon which the plate may rest, thus practically forming a bottom for the baling-chamber and obviating the necessity of other devices at that point for retaining the cotton in the chamber after it is relieved from the pressure of the follower. This preferred construction is hereinafter referred to by me in describing the operation of the press. Two channels $n^2$, crossing each other at right angles, are usually formed on the upper surface of the follower-plate to permit the insertion of the bale-ties, and the lower surface of the plate is formed with a boss or projection which fits into a corresponding recess on the upper surface of the plunger. A recess $n^3$ is provided in the follower-plate to receive the core-button and permit the plate to be carried up against the rollers. The plunger $n$ extends into the cylinder O and works through a gland P, upon which the lower ring $l'$ of the baling-chamber seats when the gland rises. The gland P also extends into the cylinder O and is actuated by the pressure therein. A packing-ring $o$ prevents leakage around the plunger and gland. Referring to Figs. 1 to 5, when pressure is admitted to the cylinder O by any suitable governing device, such as a valve controlled by the hand-lever $o'$, the plunger and gland are carried up together until the baling-chamber L is in operative position immediately under but not in contact with the surfaces of the rollers. At this point its movement is arrested by stops consisting of the bolts $p$, which pass through lugs $p'$ on the gland P and are secured in the base A. The upward movement of the plunger, however, is not arrested, but continues until the upper surface of the follower contacts with the working surfaces of the feed-rollers. In the construction illustrated in Fig. 8 the baling-chamber is carried up until the top ring $l$ contacts with the rollers.

For the purpose of confining the completed bale in the baling-chamber until the tying operation is performed a number of radial slides Q are fitted at the top of the baling-chamber, the supports $q$ for the slides, on which they may be moved in and out toward and from the axis of the baling-chamber, being carried by the ring $l$, as clearly shown in Figs. 2 and 5, in which the slides are illustrated in their outermost position. Guides $q'$ for the slides are carried by the supports $q$, and each slide is provided with an abutment $q^2$. The slides Q are actuated by cams R, which are carried by the revoluble carrier D and which are thrown into operative engagement with the abutments $q^2$ by movable abutments S, secured to the ring B. These movable abutments S in the particular form which I have shown them are carried on the ends of the levers $s$, which are pivoted intermediate their ends to the under side of the ring B. The abutments S project below the face of the levers, so as to lie directly opposite the abutments on the slides Q, and the outer ends of the levers are slotted to receive pins $s'$, carried on the shifting ring $s^2$, which plays loosely in a groove extending around the ring B on its under side. Stop-pins $s^3$ on the ring B are provided for the outer ends of the levers $s$. The cams R are pivoted to the under side of the carrier D and are held normally in inoperative position by the spring $r$, which bears against one end of the cam and presses a lug on the opposite end in contact with the pin $r'$ on the carrier. The cams R have depending wedge-shaped portions, which lie in the same horizontal plane as the abutments S. When the press is in operation and the bale is in process of formation, the slides Q are in the position shown in Figs. 2 and 8, the levers $s$ are in the position shown in dotted lines in that section of Fig. 2 in which the abutment S is illustrated in full lines, and the cams are carried around by the revolving carrier in a path which lies between the abutments S and $q^2$ and do not contact with either of them. When, however, the bale is formed and it is desired to force the ends of the slides Q into the baling-chamber over the top of the bale, the ring $s^2$ is shifted by the hand-lever $s^4$ through suitable intermediate connections to move the levers $s$ and abutments S into the position shown in full lines in said Fig. 2. The cams R will now in passing engage the abutments S and will be swung inwardly on their pivots, so that the inclined surface of the wedge-shaped projection on the cams will engage the abutments $q^2$ successively and force the slides Q inwardly toward the center of the bale. A spring $s^5$ presses the ring $s^2$ to return the latter and with it the levers $s$ to their normal inactive position as soon as the operator releases the hand-lever $s^4$. I have shown in the drawings four slides actuated by two cams; but it is obvious that a greater or less number of slides and cams may be employed, if desired.

The operation of my improved press is as follows: The press having been started, one of the baling-chambers is swung into the position shown in Fig. 5 and pressure is admitted to the cylinder O by operating the valve-lever $o'$. The plunger $n$ and the gland P rise, and the latter engages the bottom of the baling-chamber L, which, guided by the pins $m$, is carried up under the rollers, where its motion is arrested by the stops $p$. The plunger, however, continues its upward movement until the upper surface of the follower engages the feed-rollers F'. The cotton or other material is fed into the hopper and to the revolving rollers and is by the rollers deposited in the baling-chamber between the upper surface of the follower and the working surfaces of the rollers in superimposed spiral layers or laps under a continuous and heavy pressure, each of the rollers feeding in a separate lap, the thickness of which is determined by the distance between each roller and the stripping-finger of the next adjacent roller. When, as preferred by me, the core-button J is employed, the inner edges of the laps are guided in their passage under the rollers and held away from the center of the bale, so as to form a true and well-defined axial passage or bore from end to end of the bale through which the bale-ties may be passed; but when this well-defined axial passage or bore is not desired the core-button may be omitted, as shown in Fig. 8. As the material is fed into the baling-chamber the follower gradually recedes until it reaches the bottom of the baling-chamber. The formation of the bale will then be complete, and the retaining-slides Q are forced in over the top of the material by actuating the hand-lever $s^4$ in the manner previously described. The cylinder O is relieved of sufficient pressure to permit the baling-chamber to descend to the position shown in Fig. 5, the follower-plate $n'$ being relieved from the support of the plunger and resting on the flange $z^7$. The operator then swings the crane M half round to bring the empty baling-chamber in position over the plunger and the filled chamber into the position just occupied by the empty one. The parts are then manipulated to carry the empty chamber under the rollers, as just described, and the bale-forming operation is repeated. While this bale is being formed the one just completed is tied by suitable bale-ties, the chamber is opened by releasing the fastening devices 14 and swinging the sections apart, the bale is removed, the slides Q pushed back into place, and the chamber is closed and is ready to be moved into operative position again. These steps are repeated as each bale is formed, the operation of the press being continuous.

I have described and illustrated certain details of construction which I have embodied in a practically operative machine; but as to such details it is to be understood that it is not my intention to limit my invention to the precise forms shown and described, since many modifications may be made therein without departing from the spirit of my invention.

Having thus described my invention, what I claim as new, and desire to secure by Letters Patent, is—

1. In a bale-forming press, the combination of a plurality of converging, conical feed and pressure rollers supported at their outer ends and free from support at their inner ends and a core-button supported at the apices of the rollers, said core-button being formed in separable sections which are recessed to receive the ends of the rollers at the separating-line of the sections, substantially as shown and described.

2. In a bale-forming press, the combination of a set of converging conical feed and pressure rollers, a carrier in which said rollers are journaled, stripping-fingers connected with the carrier and a core-button supported by said stripping-fingers at the apices of the rollers.

3. In a bale-forming press, a core-button made in sections detachably connected, and having recesses in said button extending into both sections, each recess having two portions, one for receiving the end of a conical roller and the other for receiving the inner end of a stripping-finger, substantially as shown and described.

4. In a bale-forming press, the combination of a set of converging feed and pressure rollers, supports and operating devices for said rollers and fingers projecting inwardly from the carrier between the rollers, and spaced so as to form a feed-passage for the material by which the thickness of the laps forming the bale is regulated, and a core-button carried by said fingers, substantially as shown and described.

5. A bale-forming press, provided with a revoluble carrier, feed and pressure rollers journaled in the carrier, a baling-chamber below said rollers, retaining-slides on the baling-chamber, a series of movable abutments, means for actuating the abutments to bring the same into position opposite said slides, and a cam on the carrier for engaging the abutments and the slide to project the latter into the baling-chamber.

6. A bale-forming press, comprising a set of conical feed and pressure rollers arranged radially, a carrier in which the base ends of the rollers are journaled, a follower having upward pressure tendency toward said rollers, means for revolving said carrier and an overhead track for engagement by the rollers between their base and apex ends and outside the peripheral plane of the follower.

7. A bale-forming press, comprising a set of conical feed and pressure rollers arranged radially, a revoluble carrier in which said rollers are journaled, a follower having pressure tendency toward said rollers, means for revolving the carrier, an overhead annular bearing for the rollers between their base and apex ends outside the peripheral plane of the follower and a framework in which said carrier and said bearing are mounted to turn.

8. A bale-forming press, comprising a set of conical feed and pressure rollers, a carrier in which said rollers are journaled at their outer ends, and bracing devices engaging said rollers between their working surfaces and their outer bearing to relieve the pressure or strain on said bearings.

9. In a bale-forming press, the combination of a set of radially-arranged feed and pressure rollers, a revoluble carrier in which the outer portions of said rollers are journaled, a stationary support above the rollers and a bearing arranged to engage said support and also to engage the rollers at a point between their working surfaces and their outer ends.

10. In a bale-forming press, a baling-chamber, a follower, a member having movement independent of the follower, to move the baling-chamber longitudinally, and means common to both the member and the follower for moving the same into their respective positions.

11. In a bale-forming press, a baling-chamber having a follower-plate therein, means for simultaneously moving the baling-chamber longitudinally, and for exerting pressure upon the follower-plate and devices for limiting the movement of the baling-chamber without arresting the movement of the follower-plate.

12. In a bale-forming press, mechanism for actuating the follower and baling-chamber to impart longitudinal movement thereto, consisting of two members, one of which actuates the follower and the other of which actuates the baling-chamber in combination with stops for limiting the longitudinal movement of the baling-chamber independently of the follower.

13. A bale-forming press, provided with a baling-chamber, a follower for the baling-chamber, a plunger for actuating said follower, a gland surrounding the plunger, and having longitudinal movement independent thereof, for actuating the baling-chamber, and stops for limiting the motion of the baling-chamber.

14. A bale-forming press, provided with a baling-chamber, a follower for the baling-chamber, a plunger for actuating said follower, a gland surrounding the plunger, and having longitudinal movement independent thereof, for actuating the baling-chamber, and a crane on which said baling-chamber is movably mounted.

15. A bale-forming press, provided with a baling-chamber, a movable follower-plate carried in the baling-chamber, a plunger for actuating said follower-plate, a gland surrounding the plunger and having movement independent thereof, means for exerting pressure upon the plunger and gland and stops for limiting the longitudinal movement of the gland.

16. A bale-forming press, provided with a revoluble carrier, feed and pressure rollers journaled in said carrier, a baling-chamber, a follower, a retaining device on the baling-chamber for engaging the material under the rollers to retain it in the chamber upon the completion of the bale and means for actuating said retaining device from the carrier, substantially as shown and described.

17. A bale-forming press, provided with a revoluble carrier, feed and pressure rollers journaled in said carrier, a baling-chamber, a follower, a retaining device on the baling-chamber for engaging the material under the rollers, such retaining device consisting of a plurality of slides, a cam on the carrier for actuating said slides and an abutment under the control of the operator and adapted to be moved into the path of the cam, to cause the latter to act on the slides.

18. A bale-forming press, provided with a revoluble carrier, feed and pressure rollers journaled in said carrier, a baling-chamber, a follower, a retaining device on the baling-chamber for engaging the material under the rollers, a cam on the carrier for actuating said retaining device, movable abutments for imparting motion to the cam, a shifting device connected with said abutments and a hand-lever for actuating such shifting device, substantially as shown and described.

19. A bale-forming press, provided with a revoluble carrier, feed and pressure rollers journaled in said carrier, a baling-chamber, a follower, a retaining device on the baling-chamber for engaging the material under the rollers, such retaining device consisting of a plurality of slides, a cam on the carrier for engaging the slides, levers for imparting a swinging motion to the cam, a shifting device connected with said levers and a hand-lever for actuating such shifting device, substantially as described.

20. A bale-forming press, provided with a revoluble carrier, feed and pressure rollers journaled in said carrier, a baling-chamber, a follower, a retaining device on said baling-chamber for engaging the material under the rollers, such retaining device consisting of a plurality of slides, cams pivoted on the carrier for engaging the slides, levers for imparting a swinging motion to the cams to actuate the slides, a shifting ring connected with said levers, a hand-lever connected with said ring and retaining-springs for the same, substantially as shown and described.

21. A bale-forming press, provided with a plurality of baling-chambers and a swinging crane on which the said baling-chambers are mounted to move independently of each other in the direction of the axis of the crane.

22. A bale-forming press, provided with a crane having a plurality of arms, movable around a common center, and a plurality of baling-chambers carried by said arms and movable longitudinally on said arms.

In testimony whereof I have signed my name to this specification in the presence of two subscribing witnesses.

JAMES T. FULLER.

Witnesses:
 THEO. G. HOSTER,
 EVERARD BOLTON MARSHALL.